United States Patent [19]

Gerutti et al.

[11] Patent Number: 4,886,539
[45] Date of Patent: Dec. 12, 1989

[54] METHOD OF VACUUM REFINING OF GLASSY MATERIALS WITH SELENIUM FOAMING AGENT

[75] Inventors: Richard L. Gerutti; David R. Haskins, both of Cumberland; Robert B. Heithoff, LeVale, MD; Ronald L. Schwenninger, Rigely, West Va.; Wright M. Welton, Oldtown, MD.

[73] Assignee: PPG Industries, Inc., Pittsburgh, Pa.

[21] Appl. No.: 331,780

[22] Filed: Apr. 3, 1989

[51] Int. Cl.$^4$ ............................................. C03B 5/225
[52] U.S. Cl. .................................... 65/135; 65/18.3; 65/18.4; 65/20; 65/27; 65/136
[58] Field of Search ................. 65/18.1, 18.2, 18.3, 65/18.4, 20, 27, 135, 136

[56] References Cited

U.S. PATENT DOCUMENTS

| | | | |
|---|---|---|---|
| 3,203,816 | 8/1965 | Bull et al. | 65/27 X |
| 3,291,585 | 12/1966 | Okamura et al. | 65/27 X |
| 3,499,743 | 3/1970 | Fanica et al. | 65/135 X |
| 3,779,734 | 12/1973 | Simonfi et al. | 65/136 |
| 4,110,097 | 8/1978 | Chevallier et al. | 65/136 |
| 4,110,098 | 8/1978 | Mattmuller | 65/20 X |
| 4,211,568 | 7/1980 | Davis | 65/135 UX |
| 4,794,860 | 1/1989 | Welton | 65/27 X |

Primary Examiner—Arthur Kellogg
Attorney, Agent, or Firm—Dennis G. Millman

[57] ABSTRACT

In a method of vacuum refining molten glass or the like, selenium is provided in the molten glass to serve as a foaming agent, which yields improved refining. Alternatively, colored glass compositions that include selenium as a colorant are refined at higher than normal pressures to retain selenium in the glass without sacrificing refining performance.

16 Claims, 1 Drawing Sheet

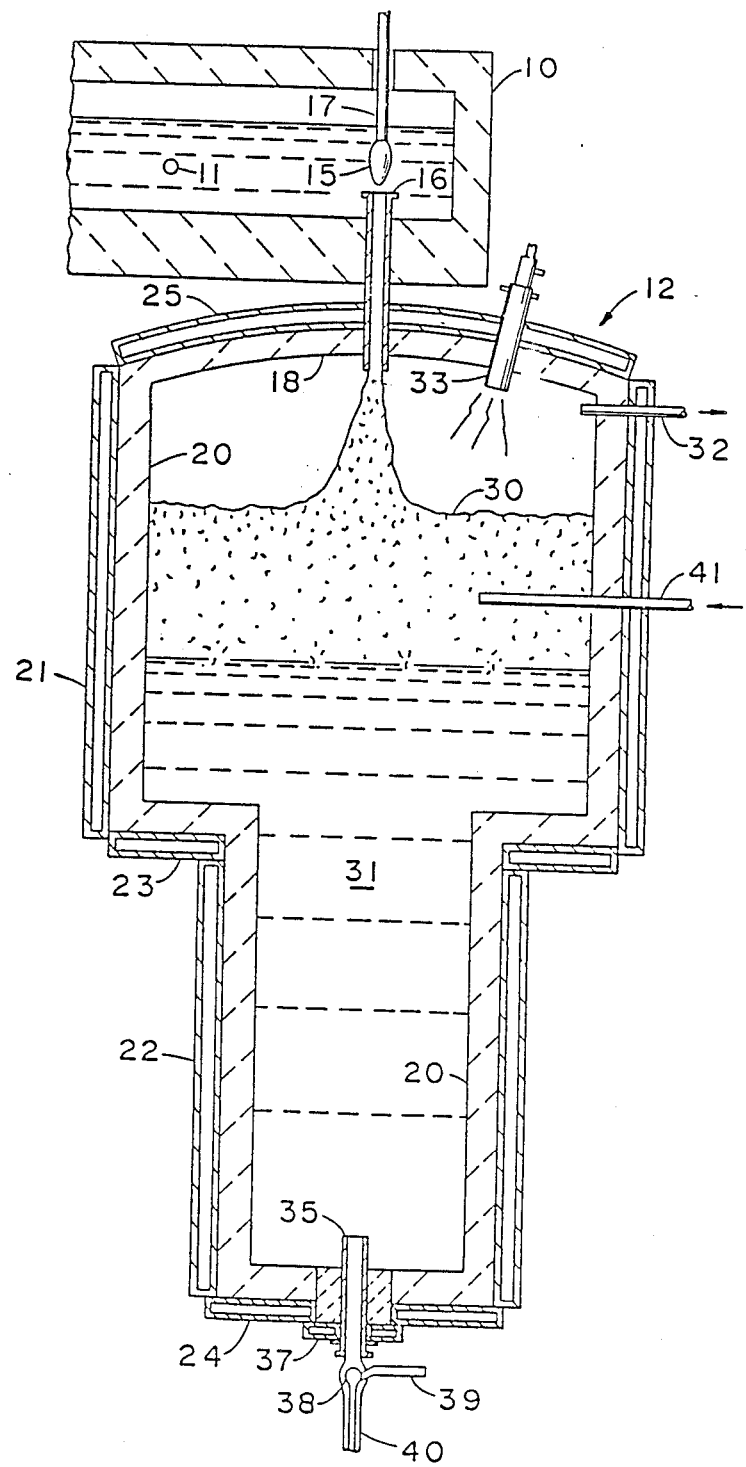

METHOD OF VACUUM REFINING OF GLASSY MATERIALS WITH SELENIUM FOAMING AGENT

BACKGROUND OF THE INVENTION

The present invention relates to the use of subatmospheric pressure to expedite refining of molten glass or the like. More particularly, the invention relates to a selected rate and extent of foaming in such a refining technique that yields improved refining performance.

In the melting of glass, substantial quantities of gas are produced as a result of decomposition of batch materials. Other gases are physically entrained by the batch materials or are introduced into the melting glass from combustion heat sources. Most of the gas escapes during the initial phase of melting, but some becomes entrapped in the melt. Some of the trapped gas dissolves in the glass, but other portions form discrete gaseous inclusions known as bubbles or "seeds" which would be objectionable if permitted to remain in unduly high concentrations in the product glass. The gas inclusions will rise to the surface and escape from the melt if given sufficient time in the stage of a melting operation known as "refining" or "fining." High temperatures are conventionally provided in the refining zone to expedite the rise and escape of the gaseous inclusions by reducing the viscosity of the melt and by enlarging the bubble diameters. The energy required for the high temperatures employed in the refining stage and the large melting vessel required to provide sufficient residence time for the gaseous inclusions to escape from the melt are major expenses of a glassmaking operation. Accordingly, it would be desirable to assist the refining process to reduce these costs.

It has been known that reduced pressure could assist the refining process by reducing the partial pressure of the included gaseous species and by increasing the volume of bubbles within the melt so as to speed their rise to the surface. The impracticality of providing a gas-tight vessel on the scale of a conventional refining chamber so as to draw a vacuum therein has limited the use of vacuum refining to relatively small scale batch operations such as disclosed in U.S. Pat. Nos. 1,564,235; 2,781,411; 2,877,280; 3,338,694; and 3,442,622.

Continuous vacuum refining processes have been proposed but have not found acceptance for large scale, continuous manufacture of glass due to various drawbacks. In the continuous vacuum refining arrangements shown in U.S. Pat. Nos. 805,139; 1,598,308; and 3,519,412 a disadvantage is the requirement for relatively narrow vertical passageways leading into and out of the vacuum zone necessitated by the pressure difference. Also, the molten glass is not fully exposed to the vacuum since the incoming glass enters from below a pool of glass.

A different arrangement is shown in U.S. Pat. No. 3,429,684, wherein batch materials are fed through a vacuum lock and melted at the top of a vertically elongated vacuum chamber. Melting raw materials within the vacuum chamber is a disadvantage of that arrangement for three reasons. First, large volumes of foam would be created by carrying out the initial decomposition of the raw materials under vacuum, which would require a vessel large enough to contain the foam. Second, there is a danger that raw materials may follow a short circulation path to the output stream, thus avoiding adequate melting and refining. Third, carrying out the initial stages of melting and heating the melt to a refining temperature within the vacuum vessel require large amounts of heat to be supplied to the melt within the vessel. Such a major heat input to the vessel inherently induces convection currents within the melt that increase erosion of the walls, which leads to contamination of the refined product stream.

U.S. Pat. No. 4,195,982 discloses initially melting glass under elevated pressure and then refining the glass in a separate chamber at a lower pressure. Both chambers are heated.

A preferred technique for vacuum refining glass is disclosed in U.S. Pat. No. 4,738,938 (Kunkle et al.) wherein the creation of foam is deliberately enhanced by introducing the molten glass into the vacuum chamber above the level of the molten glass held therein. Excessive foam was indicated in that patent as being a problem to be avoided. A large space above the liquid container must be provided to accommodate the foam if a large throughput is desired. Since this headspace must also be maintained gas-tight, its construction can be a significant economic drawback, particularly on a large scale process. As a result, the volume of foam acts as a limiting factor to the thoughput rate and/or the degree of vacuum that can be utilized.

Bronze or gray colored glasses sometimes include selenium as an essential colorant. Examples of heat-absorbing architectural glasses of this type are disclosed in U.S. Pat. Nos. 2,938,808 (Duncan et al.) and 3,296,004 (Duncan). It has been found that when these selenium-containing glasses are subjected to vacuum refining in accordance with the preferred techniques so much of the selenium is removed from the molten glass that insufficient selenium is retained in the glass product to provide the desired coloration. This problem exists even when large amounts of excess selenium are provided in the batch mixture. It would be desirable to use vacuum refining to produce selenium-containing glass.

SUMMARY OF THE INVENTION

The present invention involves two discoveries. First, it was found that selenium-containing glasses can be refined at substantially higher pressures (i.e., less vacuum) than comparable non-selenium glasses, with the result that sufficient amounts of selenium can be retained to provide the desired bronze or gray coloration in the product glass, while at the same time achieving reductions in gaseous inclusions of a degree usually attainable only at much lower pressures. The second aspect of the invention is the discovery that selenium can improve vacuum refining of glasses that do not ordinarily include selenium. The presence of selenium in the molten glass has been found to increase the amount of foaming that occurs when the melt enters the foaming chamber, which is believed to yield better refining. The foaming effect of the selenium is greater than that of the $CO_2$, $SO_3$, and water normally present in the molten glass and which usually serve as the chief foaming agents. Thus, only a small amount of selenium is required, and its high volatility results in its being almost completely removed from the melt, so that the trace of selenium remaining may have a negligible effect on the color of the product glass.

It is theorized that the thoroughness of the refining is dependent upon the degree of volume expansion produced by the foaming of the melt as it enters the vacuum chamber. The volume expansion of the foam is, in turn, a function of the concentration of relatively volatile substances in the molten glass which enter the gas phase with the reduced pressure of the vacuum chamber. Therefore, even though removal of volatile substances is the overall objective of refining, it appears that the presence of certain amounts of these substances is beneficial to act as the foaming agents.

The expansion of dissolved and entrained gases as the melt encounters the reduced pressure of the vacuum chamber is advantageously of such a magnitude to render substantially all of the liquid into the membrane walls of the foam structure. Stretching of the membrane walls by further expansion is also desirable because it reduces the thickness of the membranes, which is believed to reduce the size of the largest gaseous seed that can exist within the membranes. Additionally, the more the foam membranes have been stretched, the more readily the foam subsequently collapses. When the molten glass stream enters at the top of the vacuum chamber, it is preferred that the foaming be sufficiently rapid to substantially completely convert the liquid stream to foam before it penetrates the foam layer contained in the chamber. It is an object of the present invention to provide sufficient volume expansion so as to adequately refine the glass and to rapidly collapse the foam while avoiding impractically large accumulation of foam.

It has been found that these objectives can be met by providing in the molten glass entering the vacuum chamber sufficient quantities of selenium that will volatilize at the reduced pressure conditions of the vacuum chamber so as to produce a foam having at least eight times the volume of the molten glass liquid. Preferably the foam volume is at least ten times the molten glass volume, and most preferably at least fourteen times. Depending upon the space available in the vessel, foam expansion ratios on the order of twenty or more may require auxiliary means to expedite collapse of the foam in order to limit the height of the foam layer that gathers within the refining chamber.

The expansion ratio is also dependent on the pressure within the vacuum chamber and the vapor pressure of the selenium and other volatile materials at the particular temperature of the melt. Knowing these factors permits the concentration of volatile species required to be present in the glass to yield a desired volume expansion upon foaming to be estimated by using the ideal gas laws.

Tellurium has properties similar to selenium and would be predicted to perform as a foaming aid for the purposes of the present invention as well.

THE DRAWING

The FIGURE is a vertical cross-section through a vacuum refining vessel in accordance with a preferred embodiment of the present invention.

DETAILED DESCRIPTION

The detailed description will be set forth in conjunction with a method and apparatus specifically adapted for melting glass and similar glassy materials, but it should be understood that the invention is applicable to the processing of other materials as well.

Although not limited thereto, the present invention is advantageously used in conjunction with a vacuum refining system disclosed in U.S. Pat. No. 4,738,938. In that application an arrangement is disclosed whereby vacuum refining may be employed in a commercial scale, continuous glass melting process in a manner that advantageously and economically overcomes the drawbacks of the prior art. Molten glass is admitted to the vacuum refining chamber only after the majority of the thermal energy required for melting has been imparted to the melt so that little or no thermal energy need by supplied to the molten material contained within the vacuum chamber. Any known arrangement may be used to melt the glass prior to the refining step, but in preferred embodiment, batch materials are first liquefied at a stage specifically adapted for that step of the process such shown in U.S. Pat. No. 4,381,934, and the liquefied material is transferred to a second stage 10, a portion of which is shown in the figure, where dissolution of solid particles is essentially completed and the temperature of the material may be raised to a temperature suitable for refining. Subsequently, the molten material is passed to the vacuum chamber 12. In that arrangement, a large portion of the gaseous by-products of melting are driven off before the material is subjected to vacuum, and the region of greatest gas evolution is separated from the refining zone, whereby materials undergoing the early stages of melting cannot become mixed with portions of the melt undergoing refining. Because most or all of the thermal requirement for melting has been satisfied before the material enters the vacuum refining stage, and heating of the refining stage can therefore be substantially avoided, excessive convection of the melt in the refining zone can be avoided. As a result, vessel erosion is reduced, and the probability of incompletely refined portions of the melt becoming mixed with more refined portions is reduced. The relatively short residence time of the melting material in the melting stages upstream from the refiner in this arrangement is also advantageous for the sake of retaining volatile refining aids dissolved in the melt so that they can be utilized at the downstream refining zone.

It is preferred to heat the material in the final stage of the melting process (e.g., vessel 10) so as to raise its temperature in preparation for the refining stage to follow. Maximizing the temperature for refining is advantageous for the sake of reducing glass viscosity and increasing vapor pressure of included gases. Typically a temperature of about 2800° F. (1520° C.) is considered desirable for refining soda-lime-silica glass, but when vacuum is employed to assist refining, lower peak refining temperatures may be used without sacrificing product quality. The amount by which temperatures can be reduced depends upon the degree of vacuum. Therefore, when refining is to be performed under vacuum in accordance with the present invention, the glass temperature need be raised to no more than 2700° F. (1480° C.), for example, preferably no more than 2600° F. (1430° C.), and optimally no more than 2500° F. (1370° C.) prior to refining. Peak temperature reductions on this order result in significantly longer life for refractory vessels as well as energy savings. Combustion heat sources could be used in the vessel 10, but it has been found that this stage lends itself well to electric heating, whereby a plurality of electrodes 11 may be provided as shown in the figure extending horizontally through the sidewalls. Heat is generated by the resistance of the melt itself to electric current passing between electrodes in the technique conventionally employed to electrically melt glass. The electrodes 11 may be carbon or molybdenum of a type well known to those of skill in the art.

A valve controlling the flow of material from the melting vessel 10 to the refining stage 12 is comprised of a plunger 15 axially aligned with a drain tube 16. The shaft 17 of the plunger extends through the roof of the vessel 10 so as to permit control over the gap between the plunger 15 and the tube 16 to thereby modulate the rate of flow of material into the refining stage. The valve tube 16 may be fabricated of a refractory metal such as platinum and is fitted into an orifice at the upper end of the refining vessel, preferably in the roof 18 of the refiner, but a side wall location may also be feasible.

The refining stage 12 preferably consists of a vertically upright vessel that may be generally cylindrical in configuration, preferably with an enlarged upper portion to provide additional volume to contain the foam, and having an interior ceramic refractory lining 20 shrouded in a gas-tight water-cooled casing. The casing may include a double walled, cylindrical sidewall members 21 and 22 having annular water passageways, and circular end coolers 23 and 24. The roof 18 may be slightly domed for structural integrity and may also be provided with a fitted cooler 25. Any suitable cooling arrangement may be employed. A layer of insulation (not shown) may be provided between the lining 20 and the cooling jackets.

As the molten material passes through the tube 16 and encounters the reduced pressure within the refining vessel, gases included in the melt expand in volume, creating a foam layer 30 resting on a body of liquid 31. As foam collapses it is incorporated into the liquid body 31. Subatmospheric pressure may be established within the refining vessel through a vacuum conduit 32 extending through the upper portion of the vessel. Optionally, a burner 33 may be provided to heat the upper portion of the vessel interior. Introducing the melt at or near the top of the vacuum vessel is preferred because it places the incoming, actively foaming material having the greatest gas content above the other material in the vessel, where the thin foam membranes are exposed to the lowest pressure and the gases escaping from bursting bubbles are most free to escape into the headspace.

Refined molten material is drained from the bottom of the refining vessel 12 by way of a drain tube 35 of a refractory metal such as platinum. The drain tube 35 preferably extends above the surface of the refractory bottom within which it is mounted to prevent any debris from entering the output stream. Leakage around the tube may be prevented by a water cooler 37 affixed to the bottom cooling jacket 24. The flow rate of molten material from the drain tube 35 may be controlled by a conical throttle member 38 carried at the end of a stem 39. The stem 39 is associated with mechanical means (not shown) to adjust the elevation of the throttle member 38 and thus adjust the gap between the throttle member and the tube 35 so as to control the flow rate therefrom. A molten stream 40 of refined material falls freely from the bottom of the refining vessel and may be passed to a forming station (not shown) where it may be shaped to the desired product. Refined glass, for example, may be passed to a float glass forming chamber where the molten glass floats on a pool of molten metal to form a flat sheet of glass.

The height of molten material 31 retained in the refiner 12 is dictated by the level of vacuum imposed in the chamber. The pressure head due to the height of the liquid must be sufficient to establish a pressure equal to or greater than atmospheric at the outlet to permit the material to drain freely from the vessel. The height will depend upon the specific gravity of the molten material, which for soda-lime-silica glass at the temperatures involved is about 2.3. A height in excess of the minimum required to offset the vacuum may be desired to account for fluctuations in atmospheric pressure, to permit variation of the vacuum, and to assure steady flow through outlet. In the preferred embodiments of the present invention, a substantial excess height is provided so that the outlet flow rate is not determined by the vacuum pressure, but rather by mechanical valve means. Such an arrangement permits the throughput rate and the vacuum pressure to be varied independently of each other. Alternatively, the pressure at the outlet could be below atmospheric if the outlet is provided with pump means to overcome the pressure differential. An example of a pump that is intended for use with molten glass is disclosed in U.S. Pat. No. 4,083,711.

The benefits of vacuum on the refining process are attained by degrees; the lower the pressure, the greater the benefit. Small reductions in pressure below atmospheric may yield small improvements, but to economically justify the vacuum chamber the use of substantially reduced pressure is preferred. Thus, an absolute pressure of no more than one-half atmosphere is preferred for appreciable refining improvements to be imparted to soda-lime-silica glass. Flat glass quality standards generally require absolute pressures less than 100 torr. To optimize the foam enhancement of the present invention, absolute pressures less than 50 torr are preferred. A typical range for float glass quality is 20 to 40 torr. A measure of the degree of refining is the number and size of gaseous seeds remaining in the product glass. The maximum number of seeds allowed varies according to the intended use of the product, but an example of a high quality level sometimes required for commercial float glass is about one seed per 1,000 to 10,000 cubic centimeters. Seeds less than 0.01 millimeter in diameter are considered imperceptible and are not included in the seed counts. Other products may permit ten times as many seeds or more.

When the vacuum refining is carried out at pressures less than 50 torr in order to achieve flat glass seed count standards, it has been found that selenium is substantially completely removed from the glass, whereby an intended bronze or gray color dependent on the presence of selenium is not attained in the product glass. Raising the pressure might be expected to retain more of the volatile selenium, but with a sacrifice in the effectiveness of the refining. Previously, with glasses not containing selenium, it had been observed that the amount of foaming was substantially suppressed and the refining was not as thorough as would be desired for flat glass products when the pressure in the headspace of the vacuum refining chamber exceeded 100 torr. But with selenium-containing compositions it was surprisingly found that when the pressure was raised above 100 torr to reduce selenium volatilization, foaming remained vigorous and the number of gaseous seeds in the product remained acceptable for flat glass applications. As a result, it is possible to make bronze or gray selenium-containing flat glass products by a vacuum refining process by employing pressures substantially higher than required to produce equivalent seed count levels with clear glass that does not include selenium. The upper pressure limit will depend upon the temperature, throughput rate, and the amount of selenium required to be retained in the product. It may be feasible to operate as high as 200 torr for typical products containing selenium.

In one example, it was attempted to produce a bronze colored, soda-lime-silica flat glass product having target colorant concentrations of approximately 0.35 percent by weight $Fe_2O_3$, 0.003 percent by weight CoO, and 0.0018 Se, employing the type of vacuum refining arrangement shown in the drawing. Selenium was added to the vessel 10 upstream from the vacuum chamber along with the cobalt and a portion of the iron colorants in the form of a commercially available color compact, which constitutes a granular frit material. The molten glass entering the vacuum chamber had about 0.0130 percent by weight selenium. The redox state of the glass, measured as the ratio of FeO to total iron expressed as $Fe_2O_3$, was 0.28. At a throughput of 15 tons per day, a molten glass temperature of about 2550° F. at the outlet of vessel 10, and a pressure of 40 torr in the vacuum refining vessel, only 0.0003 to 0.0005 percent selenium remained in the product glass. Permitting the pressure to rise to 140 torr resulted in sufficient selenium being retained to meet the color requirements, and yet the molten stream entering the vacuum chamber continued to be fully foamed. The seed count at 140 torr did not rise appreciably from that at 40 torr, but remained in the acceptable range, typically less than five seeds per square foot (at 3 millimeters thickness). When the selenium was subsequently omitted, with all other operating conditions being held essentially constant at 140 torr, the seed count rose to 30 to 150 per square foot.

Apart from making colored glasses, the present invention includes the use of selenium as a foaming agent for vacuum refining glass of any composition or color. When the glass is refined at pressures below 100 torr, preferably below 50 torr, the trace amount of selenium remaining in the product glass may not significantly affect the color of some products. A residue of no more than 0.0002 percent by weight of selenium may be tolerated in some clear glass products that otherwise are not intended to include selenium. More residual selenium can be tolerated in colored glasses. In some cases the slight pink or brown color caused by residual traces of selenium may be compensated by including other colorants such as cobalt oxide. Because of the vigorous foaming action of selenium, less selenium need be present in the molten glass when refining at the lower pressures. For example, a concentration of 0.003 percent by weight selenium in the molten glass entering the vacuum chamber is estimated as yielding adequate refining at about 28 torr at a throughput of 300 tons per day. Less selenium (e.g., as low as 0.001 percent by weight) in the incoming glass may be acceptable under other conditions or for other products.

Whether making clear or colored glass, substantial losses of selenium from the melt can occur upstream from the vacuum refining stage. Therefore, it is preferred to initiate melting of the base glass batch materials and subsequently add the selenium to the melt so as to minimize volatilization during melting. This may be carried out by adding selenium or selenium containing compounds to the molten glass in vessel 10, for example. Even so, volatilization of about half of the selenium can be expected before the melt enters the vacuum refining chamber. Premature volatilization of selenium can also be suppressed by maintaining the molten glass in an oxidized state. The glass may be rendered more oxidized by adding an oxidizing agent such as sodium nitrate (e.g., up to about 0.5 percent by weight) to the batch mixture or to the melt in vessel 10 in the arrangement shown in the drawing. If the batch mixture is preheated before melting is initiated and the oxidizing agent has a relatively low melting temperature, it may be fed separately to the initial melting stage. If the product requirements dictate a more reduced state (such as a requirement that a certain portion of the iron be in the ferrous state for specific transmittance properties) the molten glass can be reduced subsequent to the refining state such as in a stirring chamber downstream from the vacuum refining chamber. In this regard, it may be beneficial to stir while the molten, refined glass is in contact with molten tin in an arrangement such as that disclosed in U.S. Pat. No. 4,744,809 (Pecoraro et al.).

A vacuum system associated with a vacuum refining arrangement advantageously includes a condenser to remove liquids such as water from the gases being withdrawn from the vacuum refining chamber, thereby reducing the gas volume being acted upon by the vacuum pump. Selenium would also be recovered in such a condenser during the practice of the present invention, thereby minimizing discharge of selenium into the atmophere and rendering recycling of the selenium feasible. Although selenium is more clostly than other foam enhancing materials, recycling may render the use of selenium economically attractive.

It is the primary objective of this invention to increase the volume expansion of the material upon foaming. Extending the expansion of the foam has also been found to expedite its collapse, which is desirable for the sake of maintaining a manageable height of foam within the refining vessel. However, it may be preferred to use auxiliary foam breaking means to suppress accumulation of foam, particularly at the higher volume expansion ratios. To this end, it may optionally be desirable to use the techniques disclosed in U.S. patent application Ser. No. 102,227 filed Sept. 29, 1987, by W. M. Welton now U.S. Pat. No. 4,794,860. In the preferred embodiment, a conduit may extend into the vacuum vessel for introducing foam-breaking agents such as water into contact with the foam. In the drawing, there is shown an arrangement for injecting the water or other foam-breaking liquid into the refining vessel 12 wherein a tube 41 carrying the liquid terminates within the foam layer 30. The tube 41 may extend into the foam from above or may extend substantially horizontally from an opening in the side wall of the vessel 12 at an appropriate elevation as shown in the figure. The tube 41 may be provided with a water-cooled jacket to enhance its preservation. The pressure difference between the interior and exterior of the vessel will draw the liquid into the vessel.

Another foam-breaking technique that may optionally be employed in conjunction with the present invention is to periodically impose a sudden pressure change on the refining vessel interior. This may take the form of a pulse of reduced pressure from an auxiliary vacuum source. Alternatively, pulses of higher pressure may be provided by periodically opening the refining vessel interior to atmospheric pressure.

The foaming of the molten material as it enters the vacuum refining vessel is caused by enlargement of bubbles and gaseous seeds present in the melt and by relatively low vapor pressure substances coming out of solution. Any substance in the molten glass that is in the gas phase or comes out of solution under the conditions of the vacuum refining chamber will contribute to the expansion upon foaming. The bubbles and seeds that refining is intended to eliminate usually include nitrogen, carbon dioxide, and $SO_3$. Water is also present in solution in molten glass, and its foaming effect can be significant. Commercial soda-lime-silica glass typically contains about 0.02 to 0.04 percent by weight water. The amounts of these gaseous substances present in the glass, particularly the $SO_3$ and water, may be taken into account when calculating by the ideal gas law the amount of selenium needed to yield a desired foam expansion ratio. At least 90 percent of the selenium and about a 75 to 90 percent of the $SO_3$ will be extracted from the melt under the preferred vacuum refining conditions, but only about 40 to 50 percent of the water will be removed under the same conditions. The amount of selenium retained in the glass after vacuum refining is a function of the vacuum level used and the redox condition of glass.

Other variations as would be known to those of skill in the art may be resorted to within the scope of the present invention as defined by the claims that follow.

We claim:

1. A method of refining glassy materials or the like wherein a stream of molten material is foamed as it is subjected to subatmospheric pressure, the improvement comprising providing in the molten material prior to being subjected to the subatmospheric pressure a quantity of a material selected from the group consisting of selenium, tellurium, and mixtures thereof to enhance the volume expansion of the foam.

2. The method of claim 1 wherein the volume of the material is increased at least eight times by foaming.

3. The method of claim 1 wherein the volume of the material is increased at least ten times by foaming.

4. The method of claim 1 wherein the subatmospheric pressure is less than 50 torr absolute.

5. The method of claim 1 wherein the molten material includes at least 0.001 percent by weight selenium when it is initially subjected to the subatmospheric pressure.

6. The method of claim 1 wherein the molten material includes at least 0.003 percent by weight selenium when it is initially subjected to the subatmospheric pressure.

7. The method of claim 5 wherein the molten material includes no more than 0.0002 percent by weight selenium after refining.

8. The method of claim 1 wherein the selenium and/or tellurium is added to the molten material after the material has been at least partially melted.

9. The method of claim 8 wherein an oxidizing agent is added to the molten material after the material has been at least partially melted.

10. The method of claim 8 wherein an oxidizing agent is added to preheated glassmaking batch materials at an initial melting stage producing the molten stream.

11. The method of claim 1 wherein the molten material is at a temperature of at least 2500° F. when entering the subatmospheric pressure.

12. The method of claim 1 wherein the molten material is soda-lime-silica glass.

13. A method of making glass including selenium as a colorant comprising:

melting the glass, subjecting the selenium-containing molten glass to subatmospheric pressure in the range of 100 to 200 torr absolute so as to refine the glass, and passing the refined glass to a forming operation with at least 0.001 percent by weight selenium retained in the glass.

14. The method of claim 13 wherein the molten glass is foamed to a volume expansion of at least eight times upon being subjected to the subatmospheric pressure.

15. The method of claim 13 wherein the selenium is added to the molten glass subsequent to being melted.

16. The method of claim 15 wherein an oxidizing agent is added to the molten glass subsequent to being melted.

* * * * *

UNITED STATES PATENT AND TRADEMARK OFFICE
CERTIFICATE OF CORRECTION

PATENT NO. : 4,886,539

DATED : December 12, 1989

INVENTOR(S) : Richard L. Cerutti, et al.

It is certified that error appears in the above-identified patent and that said Letters Patent is hereby corrected as shown below:

On the title page:
Inventor's name "Gerutti" should be --Cerutti--.

Signed and Sealed this

Eighteenth Day of December, 1990

Attest:

HARRY F. MANBECK, JR.

*Attesting Officer*  *Commissioner of Patents and Trademarks*